(12) United States Patent
MacLachlan

(10) Patent No.: US 8,757,366 B2
(45) Date of Patent: Jun. 24, 2014

(54) HINGE ROD RETAINER FOR A MODULAR CONVEYOR BELT

(75) Inventor: Gilbert J. MacLachlan, Harahan, LA (US)

(73) Assignee: Laitram, L.L.C., Harahan, LA (US)

( * ) Notice: Subject to any disclaimer, the term of this patent is extended or adjusted under 35 U.S.C. 154(b) by 103 days.

(21) Appl. No.: 13/421,432

(22) Filed: Mar. 15, 2012

(65) Prior Publication Data
US 2013/0240335 A1 Sep. 19, 2013

(51) Int. Cl.
*B65G 17/38* (2006.01)
*B65G 17/08* (2006.01)

(52) U.S. Cl.
USPC .............. 198/853; 198/844.1; 198/844.2; 198/848; 198/851; 198/852

(58) Field of Classification Search
USPC .......... 198/844.1, 844.2, 845, 848, 851, 852, 198/853
See application file for complete search history.

(56) References Cited

U.S. PATENT DOCUMENTS

| | | | |
|---|---|---|---|
| 5,083,660 A | | 1/1992 | Horton |
| 5,482,156 A | | 1/1996 | Damkjaer |
| 5,573,106 A | | 11/1996 | Stebnicki |
| 5,598,916 A | * | 2/1997 | Horton et al. ............... 198/852 |
| 5,816,390 A | | 10/1998 | Stebnicki |
| 5,899,322 A | | 5/1999 | Gamble, Jr. |
| 5,954,187 A | * | 9/1999 | Hager ............................ 198/778 |
| 5,996,776 A | | 12/1999 | van Zijderveld |
| 6,308,825 B1 | | 10/2001 | Nakamura |
| 6,488,144 B2 | * | 12/2002 | Winkelman et al. ........ 198/844.2 |
| 6,499,587 B1 | | 12/2002 | Greve |
| 6,763,936 B2 | | 7/2004 | Marsetti et al. |
| 6,814,223 B1 | * | 11/2004 | Verdigets et al. ........... 198/844.1 |
| 6,857,516 B1 | | 2/2005 | Verdigets |
| 7,255,227 B2 | | 8/2007 | Melancon |
| 7,624,858 B2 | * | 12/2009 | Delair et al. .................. 198/778 |
| 7,802,675 B2 | * | 9/2010 | Hall ............................... 198/848 |
| 8,607,967 B2 | | 12/2013 | Neely et al. |
| 8,636,141 B2 | | 1/2014 | Neely et al. |
| 2010/0258410 A1 | * | 10/2010 | Wunsch ........................ 198/853 |
| 2013/0140152 A1 | * | 6/2013 | Neely et al. .................. 198/853 |
| 2014/0027251 A1 | | 1/2014 | Cornelissen et al. |

FOREIGN PATENT DOCUMENTS

EP 0787664 A1 8/1997
WO 2006014910 A2 2/2006

OTHER PUBLICATIONS

International Search Report and Written Opinion of the International Searching Authority, PCT/US2013/027625, mailed May 24, 2013, European Patent Office, Rijswijk, NL.

* cited by examiner

*Primary Examiner* — Leslie A Nicholson, III
(74) *Attorney, Agent, or Firm* — Catherine M. Bishop

(57) ABSTRACT

A hinge rod retainer for a modular conveyor belt. The retainer retains a hinge rod within a passageway, while allowing room for rod expansion or contraction relative to the belt width. The retainer comprises a flexible portion and a support forming an outside edge of the modular conveyor belt. The flexible portion comprises a flexible hook including an opening for allowing passage of the hinge rod into the passageway. The flexible hook defines a trapping region between the passageway and outside edge of the modular conveyor belt for trapping a hinge rod end.

23 Claims, 7 Drawing Sheets

HINGE ROD RETAINER FOR A MODULAR CONVEYOR BELT

FIELD OF THE INVENTION

The invention relates generally to power-driven conveyors and, more particularly, to hinge rod retention structure in plastic conveyor belts constructed of rows of modules pivotally interconnected by hinge rods.

BACKGROUND OF THE INVENTION

Conventional modular plastic conveyor belts and chains are constructed of modular plastic links, or belt modules, arranged end to end and side to side in rows. Spaced-apart hinge elements extending from each end of the modules include aligned rod holes. The hinge elements along the leading end of a row of modules are interleaved with the hinge elements along the trailing end of an adjacent row. Hinge rods, journalled in the aligned rod holes of interleaved hinge elements, connect adjacent rows together end to end to form a conveyor belt of selected length and width capable of articulating about a drive sprocket or drum at the hinges formed between adjacent belt rows.

Belt motion and belt tension can cause the hinge rods to migrate along the hinge or to lengthen. If a rod is allowed to extend out of the hinge beyond the side of the belt, the rod can catch on conveyor structure or other objects and cause damage. Consequently, it is important that hinge rods be contained within the belt. Many conventional modular plastic conveyor belts use a sliding retention member that can be manually moved from a closed position occluding the rod holes to an open position in which the aligned rod holes are accessible for rod insertion or removal. To prevent the retention members from accidentally moving from the closed position to the open position while the belt is running, the retention member is designed to require a significant force to move it out of its closed position. Before a hinge rod can be inserted into the aligned rod holes, a retention member must be moved out of the way. Once the rod is fully inserted, the retention member may be returned to its original position. Sliding the retention member out of the way to allow access to the hinge, pushing the rod into the aligned rod holes, and sliding the retention member back into position occluding the rod holes and retaining the hinge rod is one of the most time-consuming and physically challenging steps in the assembly and repair of modular plastic conveyor belts. And, if the retention member is inadvertently left in its open position, the unconfined rod can work its way out the side of the belt while the belt is running.

Consequently, there is a need for a rod retention system for a modular plastic conveyor belt that is self-closing and does not require the time and physical effort of conventional systems.

SUMMARY OF THE INVENTION

The present invention provides a retainer for a hinge rod in a modular plastic conveyor belt. The retainer retains a hinge rod within a passageway, while allowing room for rod expansion or contraction relative to the belt width.

According to one aspect of the invention, a module for a conveyor belt comprises a central portion and a retainer for a hinge rod. The central portion extends in a direction of belt travel from a first end to a second end, laterally from an inside edge to an outside edge and in thickness from a top side to a bottom side. The central portion includes a first set of hinge elements spaced apart along the first end and defining a first rod passageway. The retainer comprises a flexible hook extending from the outside edge of the central portion.

According to another aspect of the invention, a module for a conveyor belt comprises a central portion and a flexible retainer for a hinge rod. The flexible retainer extends from an outside edge of the central portion and includes an opening for inserting a hinge rod therethrough.

According to still another aspect of the invention, a module for a conveyor belt comprises a central portion and a retainer having a movable opening that is offset from a first rod passageway defined by the central portion when the retainer is in a first position.

According to another aspect of the invention, a conveyor belt is provided. The conveyor belt comprises a first module comprising a plurality of first hinge elements spaced across a first end of the first module, a second module comprising a plurality of second hinge elements interleaved with the first hinge elements to define a hinge rod passageway, a hinge rod inserted in the hinge rod passageway, a trapping region adjacent to the hinge rod passageway, between an outside edge of the conveyor belt and the hinge rod passageway and a flexible retainer for allowing expansion of the hinge rod into the trapping region, while containing the hinge rod within the trapping region.

BRIEF DESCRIPTION OF THE FIGURES

These aspects and features of the invention, as well as its advantages, are explained in more detail in the following description, appended claims, and accompanying drawings, in which:

DETAILED DESCRIPTION OF THE INVENTION

The present invention provides an improved hinge rod retainer for a modular conveyor belt. The present invention will be described below relative to certain illustrative embodiments. Those skilled in the art will appreciate that the present invention may be implemented in a number of different applications and embodiments and is not specifically limited in its application to the particular embodiments depicted.

Figure 6:
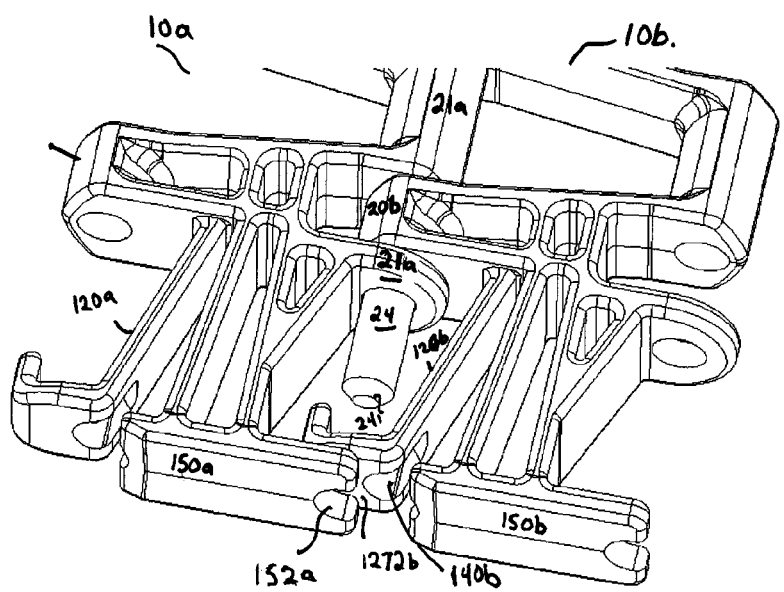
FIG. 6 is an isometric view of two modules hinged together in a modular conveyor belt.
Figure 5:
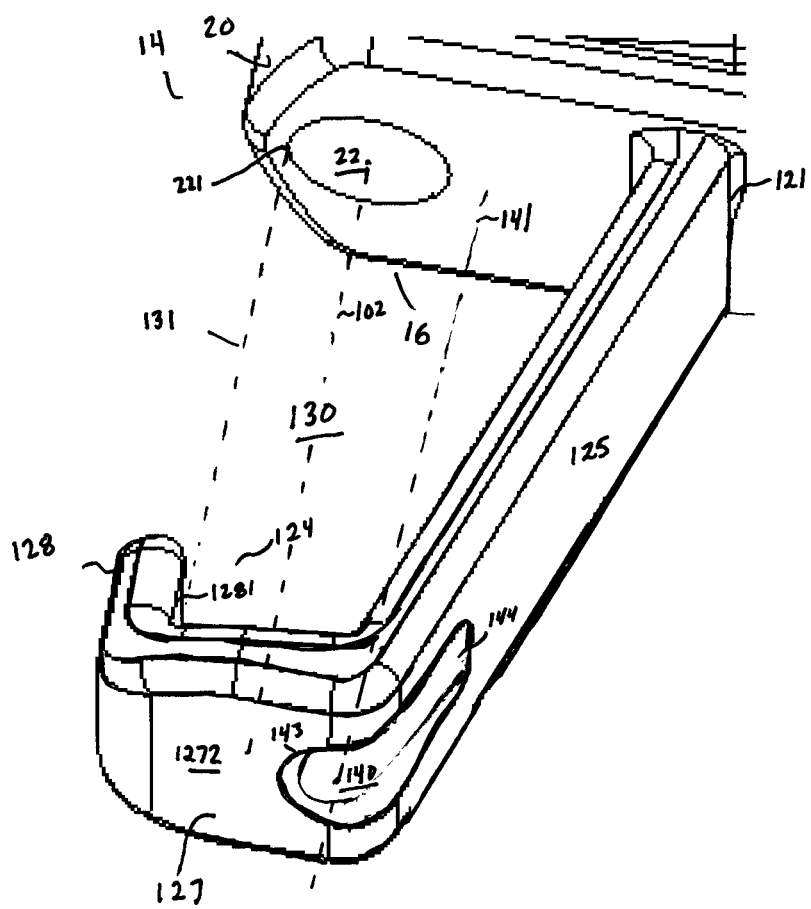
FIG. 5 is a detailed view of a flexible hook in the module of FIGS. 1-4.
Figure 7:
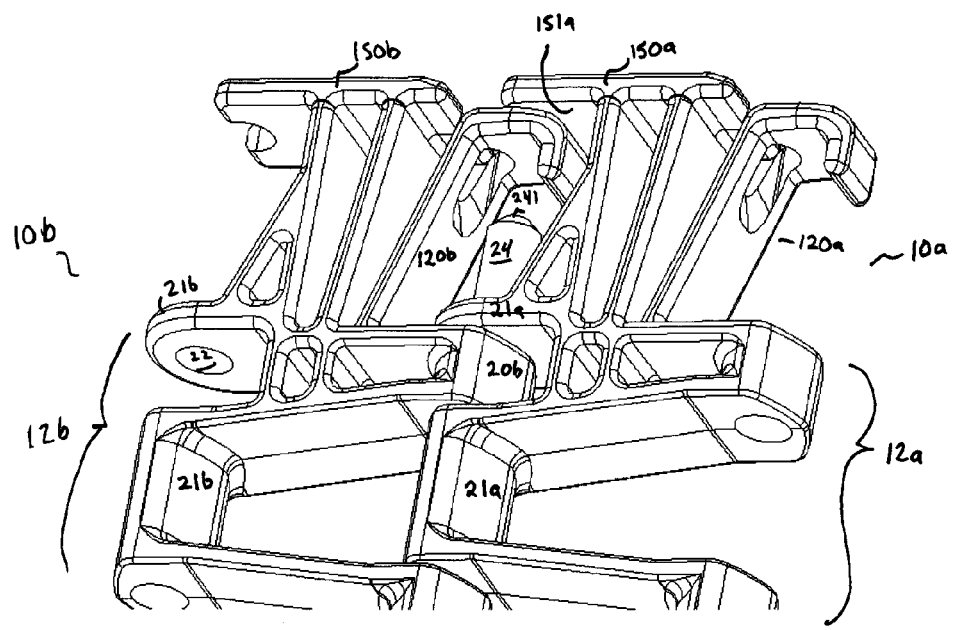
FIG. 7 is another isometric view of the two modules hinged together.
Figure 8:
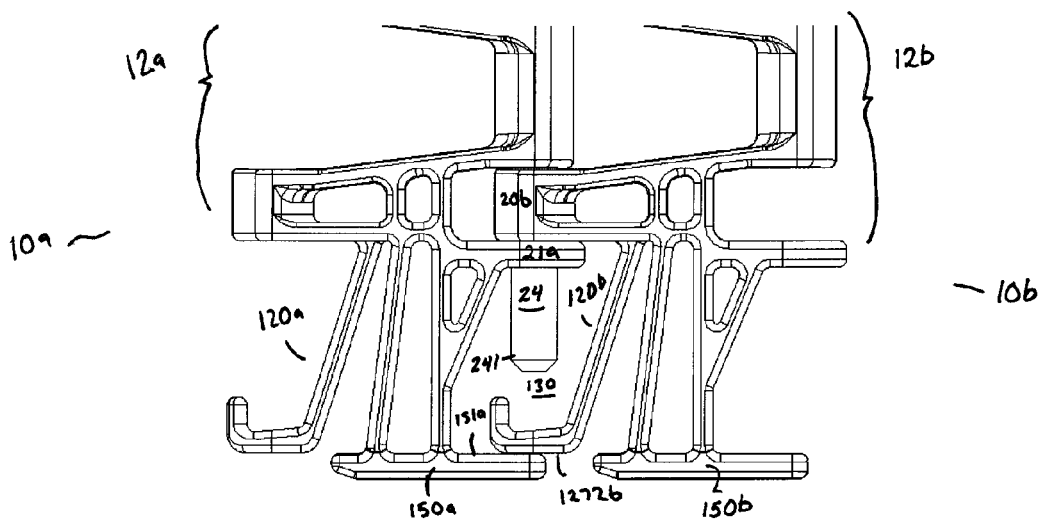
FIG. 8 is a top plan view the embodiment of FIG. 5.

The outside edge portion of an edge module 10 for a conveyor belt embodying features of the invention is shown in FIGS. 1-4. FIG. 5 is a detailed view of a flexible hook for a hinge rod retainer in the edge module 10. FIGS. 6-8 illustrate two modules 10a, 10b hinged together using a hinge rod 24 retained in a hinge rod passageway using a hinge rod retainer 100 of the present invention. A number of modules may be hinged together to form an endless conveyor belt. The illustrative edge module 10 includes a central portion 12 that extends longitudinally in the direction of belt travel from a first end 14 to a second end 15, laterally from an outside edge 16 to an inside edge (not shown), and in thickness from a top side 18 to a bottom side 19. A first set 20 of hinge elements is formed along the first end of the module; a second set 21, along the second end. Rod openings 22 in the hinge elements are aligned to form lateral passageways through the first and second sets of hinge elements. The first hinge passageway extends along an axis 102, while the second hinge passageway extends along an axis 103. The passageways admit a hinge rod 24 that connects a row of similar side-by-side modules to an adjacent row of modules into a conveyor belt. The first set of hinge elements along a row of modules interleaves with the second set of hinge elements of a longitudinally adjacent row to form a hinge with the hinge rod, as shown in FIGS. 6-8. A rod retainer 100 is formed at the outside edge 16 of the central portion for retaining a hinge rod 24 within the passageway while allowing room for rod expansion and retraction, as described in detail below.

The modules for modular plastic conveyor belts of this kind are typically injection molded out of thermoplastic materials, such as polypropylene, polyethylene, acetal, nylon, or composite resins including fibers. The rods are typically extruded or molded out of similar materials, although stainless steel rods are sometimes used. While the illustrative central portion 12 comprises transversely extending beams 13 terminating in hinge elements 20 or 21, the central portion 12 may have any suitable size, shape or configuration, and is not limited to the illustrative embodiment. For example, the central portion may comprise planar structure that is solid, perforated, "open grid," flat, shaped or otherwise configured, and include hinge elements extending from either end of the central portion.

When a single module is intended to extend across the entire width of a conveyor belt, it is also possible for a module 10 to have a rod retainer 100 at each of its lateral ends.

The illustrative rod retainer 100 comprises a flexible hook 120, shown in detail in FIG. 5, extending from an outside edge 16 of the central portion 12. A side support 150 also extends from the central portion 12 and forms an outer edge of the module 10. The flexible hook 120 and side support 150 may be integrally formed with adjoining portions of the module by injection molding, or may be separately formed from the adjoining portions of the module and attached to the module by suitable means, such as bonding, rivets, screws, or interfitting parts.

The flexible hook 120 includes a fixed end 121 connected to the central portion 12 and a hooked end 124. The body 125 of the flexible hook 120 extends transversely towards the first end 14 and outside edge of the module 10. The illustrative hooked end 124 includes an edge 127 and a tip 128. The hooked end 124 forms a trapping region 130 for trapping the end of a hinge rod inserted in the passageway defined by the hinge element openings 22. The trapping region 130 prevents the rod from moving past the side support 150. In the illustrative embodiment, the edge 127 extends in the direction of belt travel, and includes a slightly angled inner surface 1271 and an outer surface 1272. The tip 128 extends parallel to the hinge passageways 102, 103, and has an inside surface 1281 that forms a side of the trapping region 130. The inside surface 1281 is aligned with or slightly offset from a forward tip 221 of the hinge passageway, as indicated by dotted line 131.

One skilled in the art will recognize that the hooked end 124 may have any suitable configuration for trapping a hinge rod end.

Figure 1:
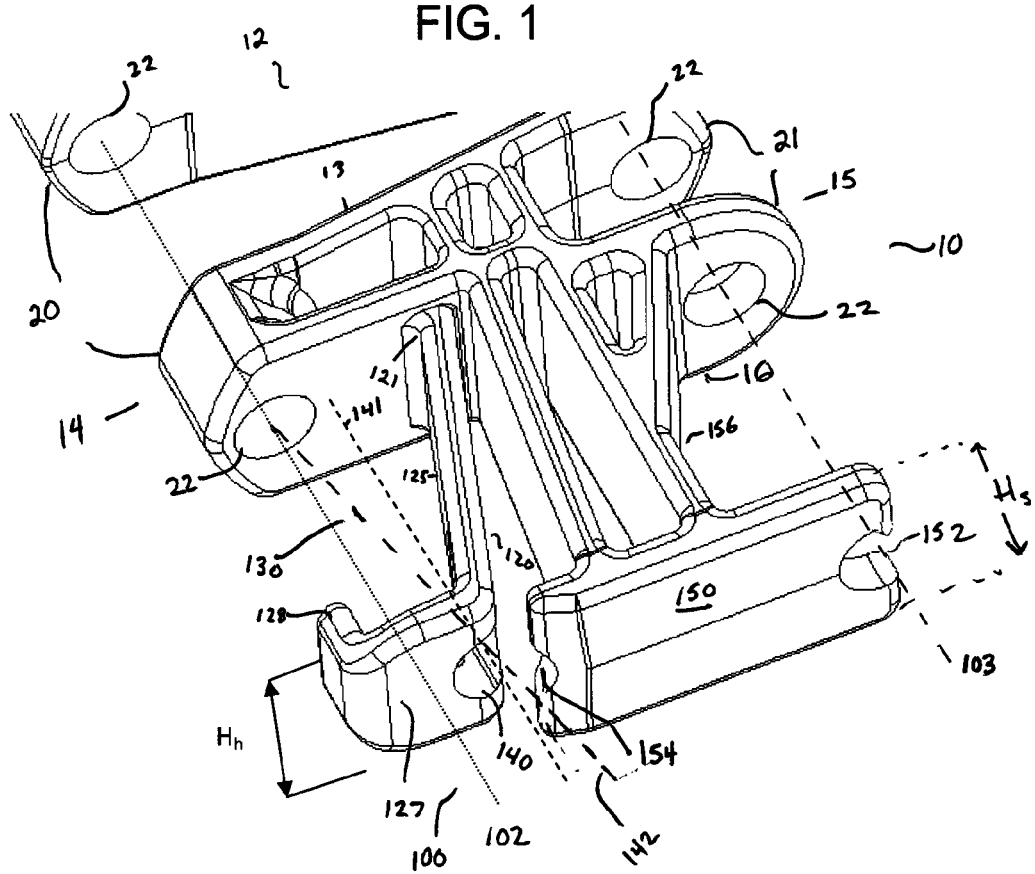
FIG. 1 is an isometric view of an embodiment of a module for a modular conveyor belt according to the present invention.
Figure 2:
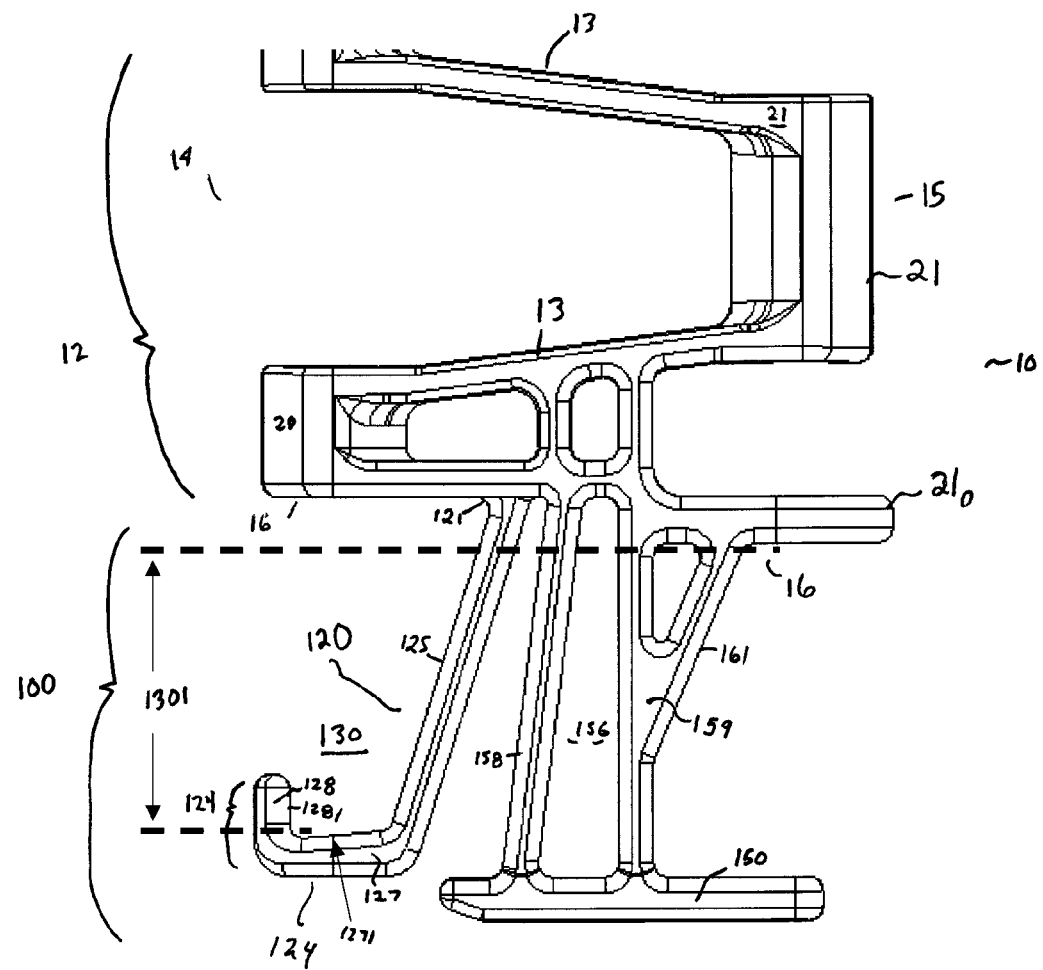
FIG. 2 is a top plan view of the module of FIG. 1.

The flexible hook 120 further includes a hinge rod opening 140 to allow passage of a hinge rod from the side of the module 10 into the passageway. When the flexible hook 120 is in the natural or relaxed position, the retainer hinge rod opening 140 is offset from the passageway formed by the hinge elements 20, 21. The opening 140 may somewhat overlap the hinge openings 22. The axis 102 of the openings 22 of the hinge elements 20 intersects a solid portion on the flexible hook 120. The axis 141 of the retainer opening is spaced from the hinge passageway axis 102, as illustrated in FIG. 1 and FIG. 5. The flexible hook 120 can be depressed to align the opening 140 with the hinge opening 22.

The illustrative hinge rod opening 140 is formed in the bend of the hook 120, but can alternatively be formed in another portion. The illustrative hinge rod opening 140 extends in two planes. For example, a first portion 143 of the hinge rod opening comprises a semi-circular recess formed in and extending into the edge 127. A second portion 144 of the hinge rod opening is formed in the body 125. The illustrative second portion 144 is trapezoidal in shape and tapers in both thickness and width.

Alternatively, the hinge rod opening 140 may extend through only a single portion, such as the edge portion 127, or have another suitable shape, size or location suitable for allowing passage of a hinge rod into the passageway formed by the hinge elements. In another embodiment, the flexible hook 120 is solid and the hinge rod enters the hinge rod passageway through the top or bottom of the belt via the trapping region 130. Or, a recess formed in a top or bottom of the edge 125 may allow passage of a hinge rod into the hinge rod passageway formed by the hinge elements.

While the illustrative body 125 of the flexible hook 120 extends transversely relative to the central portion 12, the body 125 may have any suitable size, shape, stiffness and structure suitable for forming a trapping region for a hinge rod. For example, the body 125 may be tapered, straight, curved, corrugated or have another suitable shape and may extend transversely or straight relative to the central portion. In addition, the length of the body 125 may be altered to increase or decrease the trapping region 130, which extends by a length of 1301 from the outermost hinge element $21_o$ defining part of the central portion side edge 16.

The support 150 forms a side edge of the module 10 and includes two end recesses 152 and 154. The base 156 for the support 150 also extends from the central portion 12 of the module, and may have any suitable configuration. Recess 152 aligns with the passageway defined by the second set of hinge elements 21, extending along axis 103. Recess 154 cooperates with the hinge rod opening 140 of the flexible hook to define a passageway for the rod through the side of the module. The illustrative base 156 includes a first beam 158 spaced from the flexible hook 120 and a second beam 159 defining a curved or angled wall 161.

Figure 3:
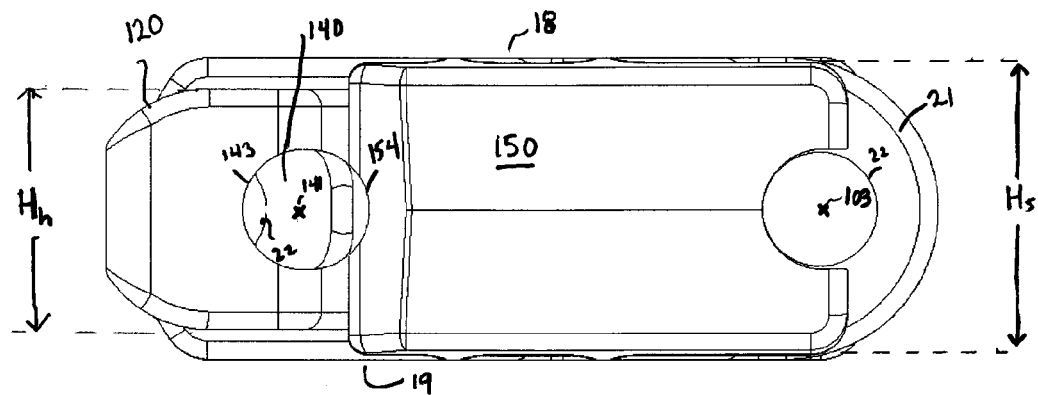
FIG. 3 is a side view of the module of FIG. 1.
Figure 4:
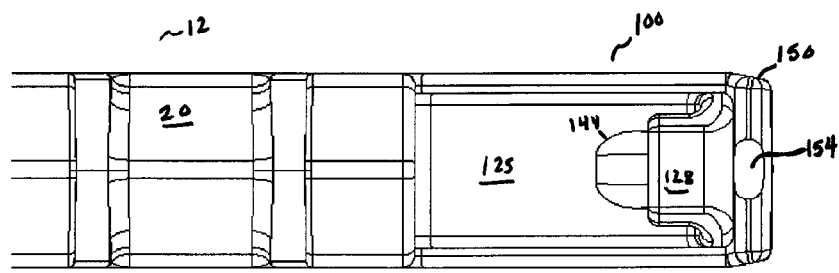
FIG. 4 is a front view of the module of FIG. 1.

Referring to FIG. 3, from the side view, the hinge opening 140 in the flexible hook 120 appears as a truncated circle, formed by portion 143. The arc of recess 154 cooperates with the hinge opening 140 to form a complete circle.

The flexible hook 120 preferably has a height $H_h$ that is less than the height $H_s$ of the side support 150, to prevent snagging of the product or conveyor.

FIGS. 6-8 illustrate two adjacent modules 10a, 10b in a conveyor belt hinged together. As shown, the hinge elements 21a, 20b are interleaved such that an outside surface 1272b of the hook 120b of the module 10b abuts or is otherwise inset from the inside surface 151a of the support 150a of an adjacent module 10a. The support 150a prevents backflexing of the flexible hook and traps the flexible hook 120b within the side edge of the conveyor belt. When high forces push the rod towards the edge of the module, the support 150a ensures that the flexible hook 120b retains the rod within the trapping area 130. The trapping area 130 allows the rod 24 to move a certain distance relative to the hinge elements 20, 21 before engaging the flexible hook 120b.

To insert the rod 24 connecting the adjacent modules 10a, 10b together, a first end of the hinge rod 24 passes through the hinge rod opening 140b, causing the hinge rod opening 140b to flex into alignment with the hinge passageway 102. Initially, the hook opening 140b is spaced from the support recess 152b. The hinge rod may initially pass through the opening 140b and recess 154b at an angle, shown by trajectory 142 in FIG. 1, in order to enter the passageway defined by the hinge elements. The insertion force causes the flexible hook 120b to flex, allowing the hinge rod to pass into and through the passageway to the other end of the conveyor belt. After insertion, the second end 241 of the hinge rod 24 may extend out of the passageway into the trapping region 130. The flexible hook 120b springs back to its natural position such that the opening 140b is offset from the passageway axis 102, preventing the rod from escaping the trapping region 130.

The retainer 100 of the present invention allows room for rod expansion or contraction relative to belt width. Rods of various materials may pass through the retainer without damage to the flush edge design.

The natural shape of the retainer 100 allows for superior rod retention. When the rod 24 pushes outward toward the edge of the conveyor belt, the force of the retainer naturally guides the rod 24 to the hooked end 124 and prevents the rod from going through the opening 140b. The angled inner surface 1271 on the edge portion of the hook helps guide the rod into the hooked end, which is retained within the support 150a. The outermost hinge element 21a pulls the rod away from the opening 140b when the belt is under tension, further facilitating rod retention within the retainer portion of the belt.

The illustrative retainer allows for various rod end tip shapes without the risk of the rod's rotating or pushing out of the flush edge. The trapping region 130 can be designed to have angles to guide rod away from opening 140. Extra padding can be incorporated to prevent rough rod ends from drilling out the flush edge.

In another embodiment, the flexible hook 124 may omit the tip portion, and instead the trapping region may be formed between an adjacent module and the flexible hook to trap a hinge rod.

Figure 9:
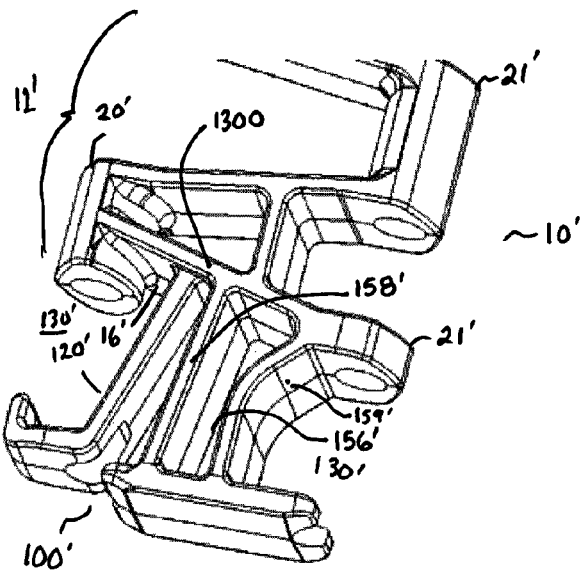
FIG. 9 is an isometric view of another embodiment of a module for a modular conveyor belt including a hinge rod retainer.

FIG. 9 illustrates an edge portion of a conveyor belt module 10' including a hinge rod retainer 100' according to another embodiment of the invention. The similar components of the module are designated with like numbers, differentiated by a prime ('). In the conveyor belt module 10' of FIG. 9, the base 156' includes a first beam 158' spaced from the flexible hook 120' and a curved second beam 159' defining the trapping area 130', and the beam 1300 forming a side edge 16' of the central portion 12' extends transversely between the hinges 20' and 21'.

Figure 10:
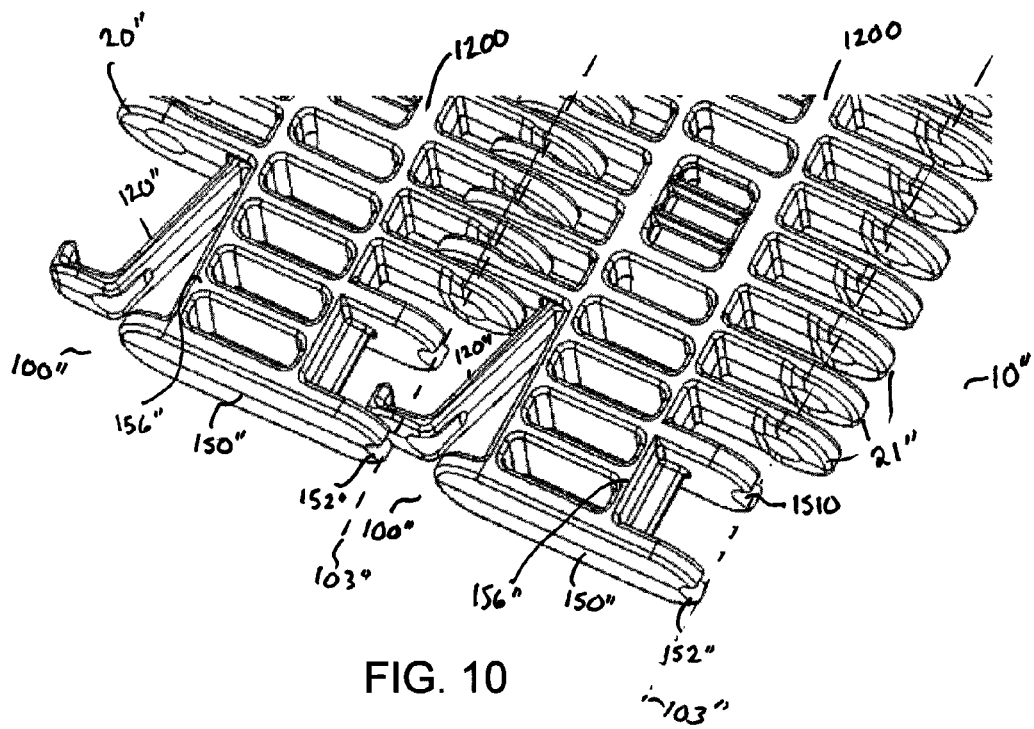
FIG. 10 is an isometric view of two modules of another embodiment of the invention hinged together in a modular conveyor belt
Figure 11:
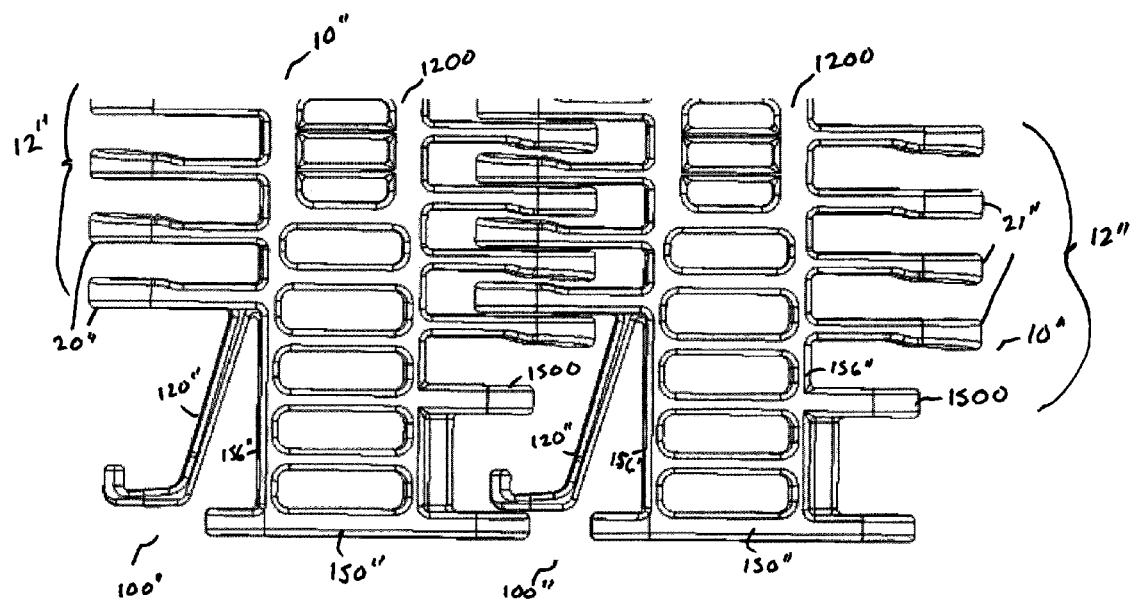
FIG. 11 is a top plan view of the modules of FIG. 10.
Figure 12:
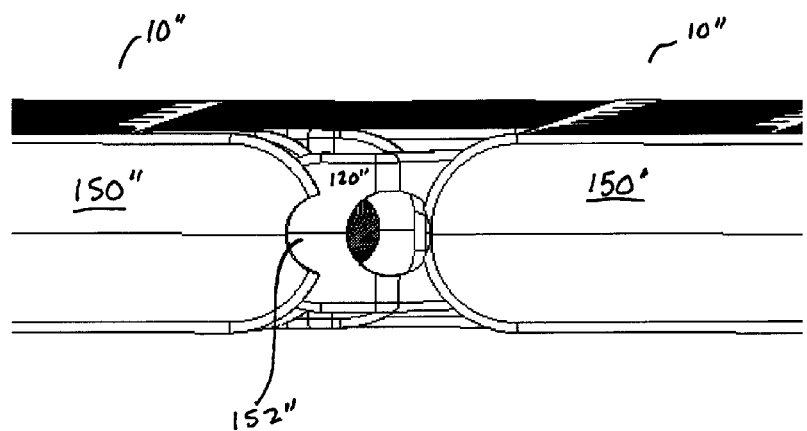
FIG. 12 is a side view of the modules of FIG. 10.

FIGS. 10-12 illustrate another embodiment of a hinge rod retainer 100" for a modular conveyor belt, which is similar to the embodiments of FIGS. 1-9. Accordingly, the same reference numerals differentiated by a double prime (") suffix have been used to identify corresponding parts. In this embodiment, however, the support 150" omits the second end recess and only includes a first recess 152" aligned with axis 103". In the embodiment of FIGS. 10-12, the central portion 12" of each module 10" comprises a central spine 1200 with hinge elements 20" and 21" extending from each end. The spine 1200 extends outward of the central portion 12" and forms part of the base 156" for the support 150". A secondary support 1500 extends from the central spine 1200 in the retention region and includes a recess 1510 aligned with passageway 103" for guiding a hinge rod through a flexible hook 120" into a hinge rod passageway formed by interleaved hinge elements 20" and 21".

The retainer may comprise any suitable structure for trapping a rod end and preventing migration of the rod end past the outside edge of the conveyor belt.

The invention claimed is:

1. A module for a conveyor belt, comprising:
a central portion extending in a direction of belt travel from a first end to a second end, laterally from an inside edge to an outside edge and in thickness from a top side to a bottom side, the central portion including a first set of hinge elements spaced apart along the first end and defining a first rod passageway; and
a retainer for a hinge rod comprising a flexible hook having a fixed end attached to and extending from the outside edge of the central portion, a body portion extending from the fixed end, an edge extending in the direction of belt travel and a tip extending perpendicular to the edge.

2. The module of claim 1, wherein the body portion of the flexible hook extends transversely relative to the direction of belt travel.

3. The module of claim 1, wherein the flexible hook includes an opening for a hinge rod.

4. The module of claim 3, wherein the opening is formed in a bend of the flexible hook.

5. The module of claim 3, wherein the opening is offset from the first rod passageway.

6. The module of claim 1, wherein the retainer further comprises a support defining an outside side edge of the module.

7. The module of claim 6, wherein the flexible hook is inset from the support.

8. The module of claim 6, wherein the support includes a first recess on a first end.

9. The module of claim 8, wherein the central portion includes a second set of hinge elements spaced apart along the second end and defining a second rod passageway and the support includes a second recess on a second end aligned with the second rod passageway.

10. The conveyor belt module of claim 1, wherein the flexible hook is integrally formed with the outside edge.

11. A module for a conveyor belt, comprising:
a central portion extending in a direction of belt travel from a first end to a second end, laterally from an inside edge to an outside edge and in thickness from a top side to a bottom side, the central portion including a first set of hinge elements spaced apart along the first end and defining a first rod passageway; and
a flexible retainer extending from the outside edge of the central portion and including an opening that is offset from the first rod passageway for inserting a hinge rod therethrough, wherein the opening can be moved into alignment with the first rod passageway upon deflection of the flexible retainer.

12. The module of claim 11, wherein the flexible retainer comprises a hook.

13. The module of claim 12, wherein the opening is formed in a bend of the hook.

14. The module of claim 11, wherein the flexible retainer includes a support defining a side edge of the module.

15. A module for a conveyor belt, comprising:
a central portion extending in a direction of belt travel from a first end to a second end, laterally from an inside edge to an outside edge and in thickness from a top side to a bottom side, the central portion including a first set of hinge elements spaced apart along the first end and defining a first rod passageway; and
a retainer for a hinge rod comprising a hook having an opening formed in a bend of the hook, wherein the opening is offset from the first rod passageway when the retainer is in a first position.

16. The module of claim 15, wherein the first rod passageway extends along an axis that intersects a solid portion of the retainer when the retainer is in the first position.

17. The module of claim 15, wherein the retainer includes a trapping region adjacent to the outside edge of the central portion.

18. The module of claim 15, wherein the hook is flexible and extends from the outside edge of the central portion.

19. The module of claim 18, wherein the retainer further includes a support forming an outside edge of the module.

20. The module of claim 15, wherein the opening aligns with the first rod passageway when the retainer is in a second position.

21. A conveyor belt, comprising:
a first module comprising a plurality of first hinge elements spaced across a first end of the first module;
a second module comprising a plurality of second hinge elements interleaved with the first hinge elements to define a hinge rod passageway;
a hinge rod inserted in the hinge rod passageway;
a trapping region adjacent to the hinge rod passageway, between an outside edge of the conveyor belt and the hinge rod passageway; and
a flexible retainer including a flexible hook extending from a central portion of the first module, the flexible hook having an outer edge extending in the direction of belt travel and a tip extending at an angle relative to the outer edge for allowing expansion of the hinge rod into the trapping region, while containing the hinge rod within the trapping region, wherein the outer edge and the tip define the trapping region, the flexible retainer further including a support forming the outside edge of the conveyor belt and extending from a central portion of the second module for preventing backflexing of the flexible hook.

22. The conveyor belt of claim 21, wherein the flexible retainer includes an opening for allowing passage of a hinge rod into the hinge rod passageway.

23. The conveyor belt of claim 21 wherein the tip extends perpendicular to the outer edge of the flexible retainer.

* * * * *